US012158129B2

(12) United States Patent
Rehwald et al.

(10) Patent No.: US 12,158,129 B2
(45) Date of Patent: Dec. 3, 2024

(54) FUEL DISTRIBUTOR RAIL FOR AN INJECTION SYSTEM AND INJECTION SYSTEM FOR MIXTURE-COMPRESSING, SPARK IGNITION INTERNAL COMBUSTION ENGINES

(71) Applicant: ROBERT BOSCH GMBH, Stuttgart (DE)

(72) Inventors: Andreas Rehwald, Bietigheim-Bissingen (DE); Ralf Weber, Ottweiler (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/005,984

(22) PCT Filed: Jul. 1, 2021

(86) PCT No.: PCT/EP2021/068123
§ 371 (c)(1),
(2) Date: Feb. 7, 2023

(87) PCT Pub. No.: WO2022/012940
PCT Pub. Date: Jan. 20, 2022

(65) Prior Publication Data

US 2023/0287856 A1 Sep. 14, 2023

(30) Foreign Application Priority Data

Jul. 14, 2020 (DE) ......................... 102020208768.7

(51) Int. Cl.
*F02M 61/14* (2006.01)
*F02M 55/02* (2006.01)
*F02M 61/16* (2006.01)

(52) U.S. Cl.
CPC .......... *F02M 61/14* (2013.01); *F02M 55/025* (2013.01); *F02M 61/168* (2013.01); *F02M 2200/853* (2013.01); *F02M 2200/856* (2013.01)

(58) Field of Classification Search
CPC .... F02M 61/14; F02M 61/168; F02M 55/025; F02M 2200/853; F02M 2200/856
(Continued)

(56) References Cited

U.S. PATENT DOCUMENTS 9,797,355 B2 * 10/2017 Reinhardt ............ F02M 55/025
9,816,472 B2 * 11/2017 Lang .................... F02M 55/005
(Continued)

FOREIGN PATENT DOCUMENTS

DE 102012206887 A1 10/2013
DE 102013200982 A1 7/2014
(Continued)

OTHER PUBLICATIONS

International Search Report issued in PCT/EP2021/068123 on Sep. 15, 2021.

*Primary Examiner* — Hai H Huynh
(74) *Attorney, Agent, or Firm* — NORTON ROSE FULBRIGHT US LLP; Gerard A. Messina

(57) ABSTRACT

A fluid distributor. The fluid distributor includes a base body, a high pressure output, and a connecting piece which is joined to the base body and is used for the high pressure output. The base body is formed by a forging operation. An interior space of the base body is formed at the base body by a machining operation after the forging operation. The connecting piece is processed by a machining operation. A holding element is provided, that, as a result of the machining operation, an accommodating opening, which leads from an outer side of the connecting piece through a wall of the
(Continued)

connecting piece and is used for at least partially accommodating the holding element, and an accommodating space, into which, during assembly, a connector of an injector is at least partially insertable in a mounting direction, are formed at the connecting piece.

10 Claims, 6 Drawing Sheets

(58) Field of Classification Search
USPC .......................................... 123/456, 457, 470
See application file for complete search history.

(56) References Cited

U.S. PATENT DOCUMENTS

| | | | | |
|---|---|---|---|---|
| 9,957,938 | B2 * | 5/2018 | Roseborsky | F02M 69/465 |
| 10,138,854 | B2 * | 11/2018 | Schultz | F02M 63/0225 |
| 10,174,734 | B2 * | 1/2019 | Reinhardt | F02M 61/14 |
| 11,525,428 | B1 * | 12/2022 | Guzman Escalante | F16B 2/248 |
| 11,692,521 | B2 * | 7/2023 | Medina Juarez | F02M 55/025 239/562 |
| 2023/0076972 | A1 * | 3/2023 | Medina Juarez | F02M 55/025 |

FOREIGN PATENT DOCUMENTS

| | | | |
|---|---|---|---|
| DE | 102016115550 | A1 | 2/2018 |
| DE | 102018110342 | A1 | 10/2019 |
| WO | 2018007188 | A1 | 1/2018 |

* cited by examiner

FIG. 2
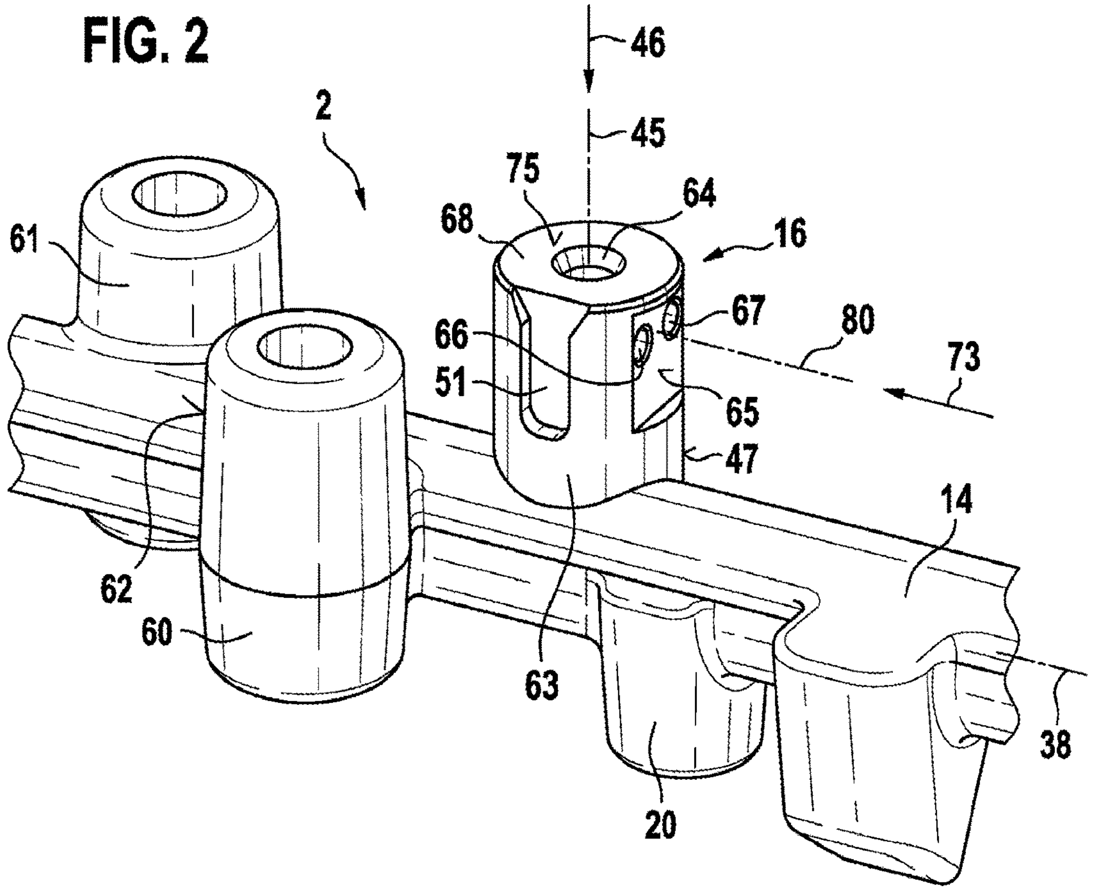
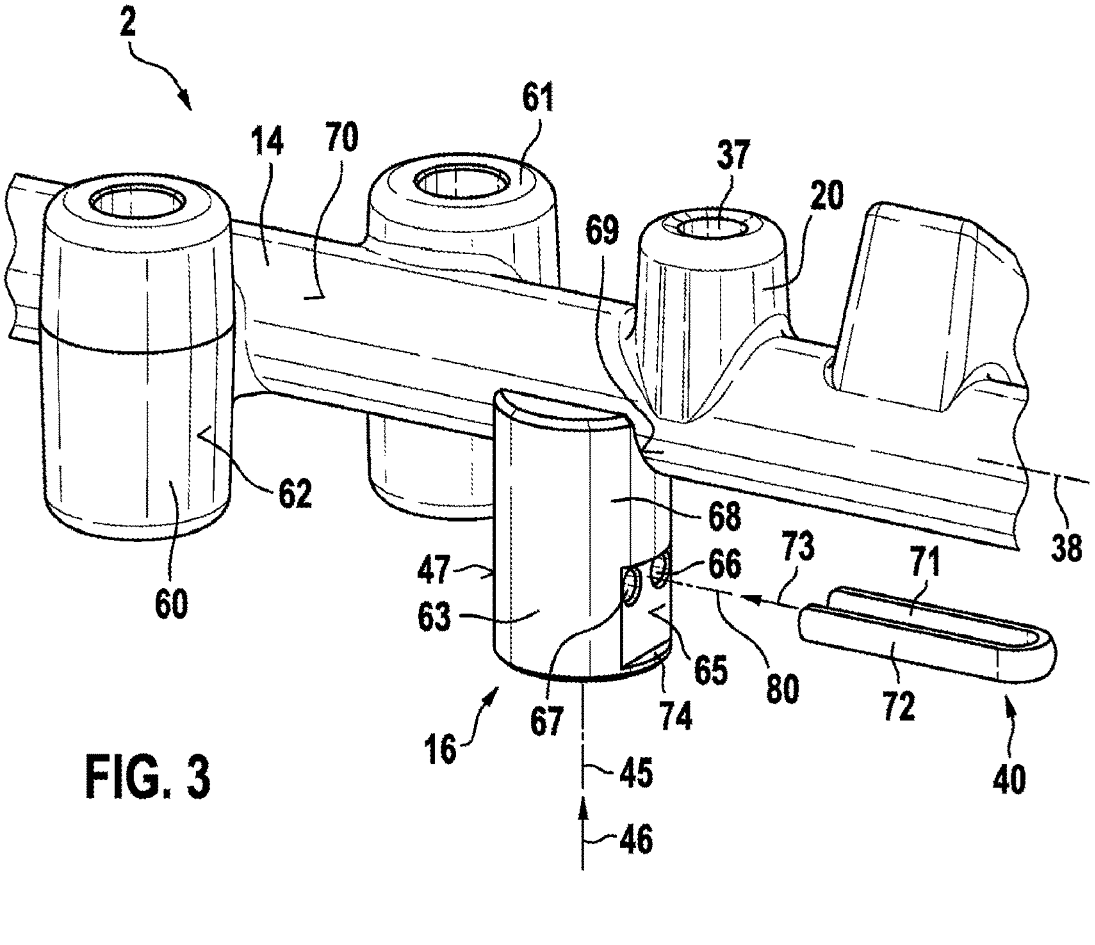
FIG. 3

FIG. 4
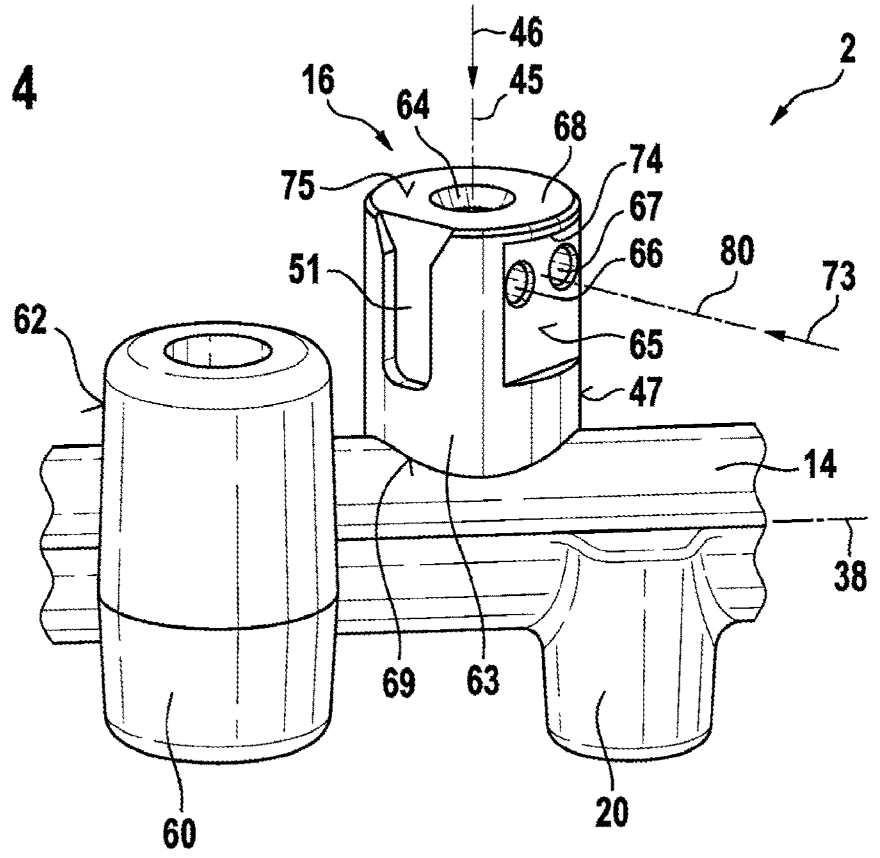
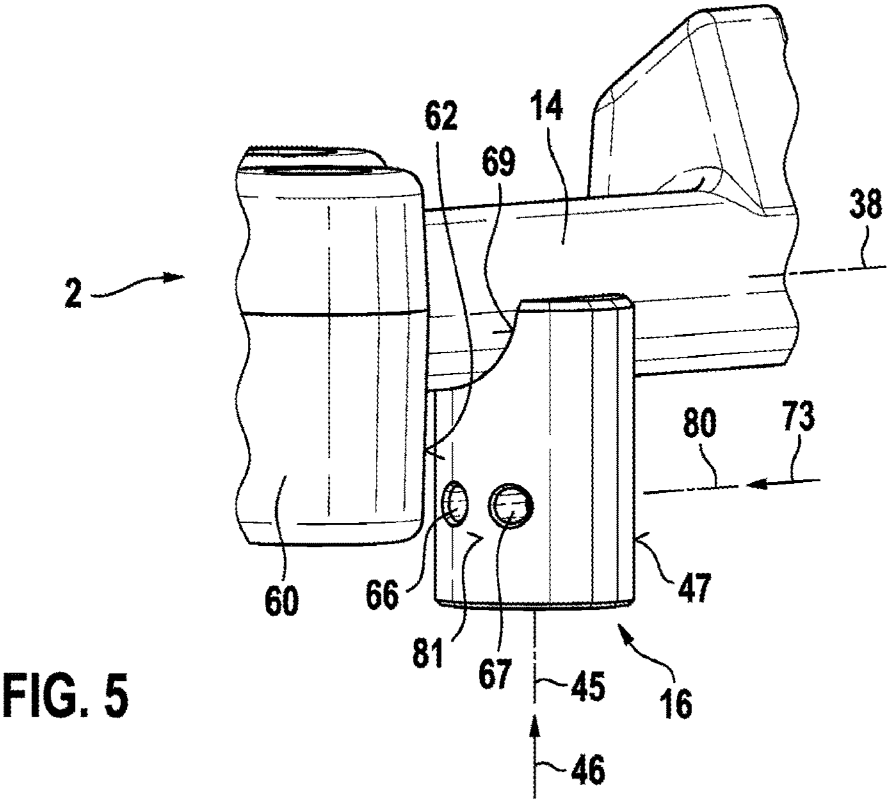
FIG. 5

FIG. 6
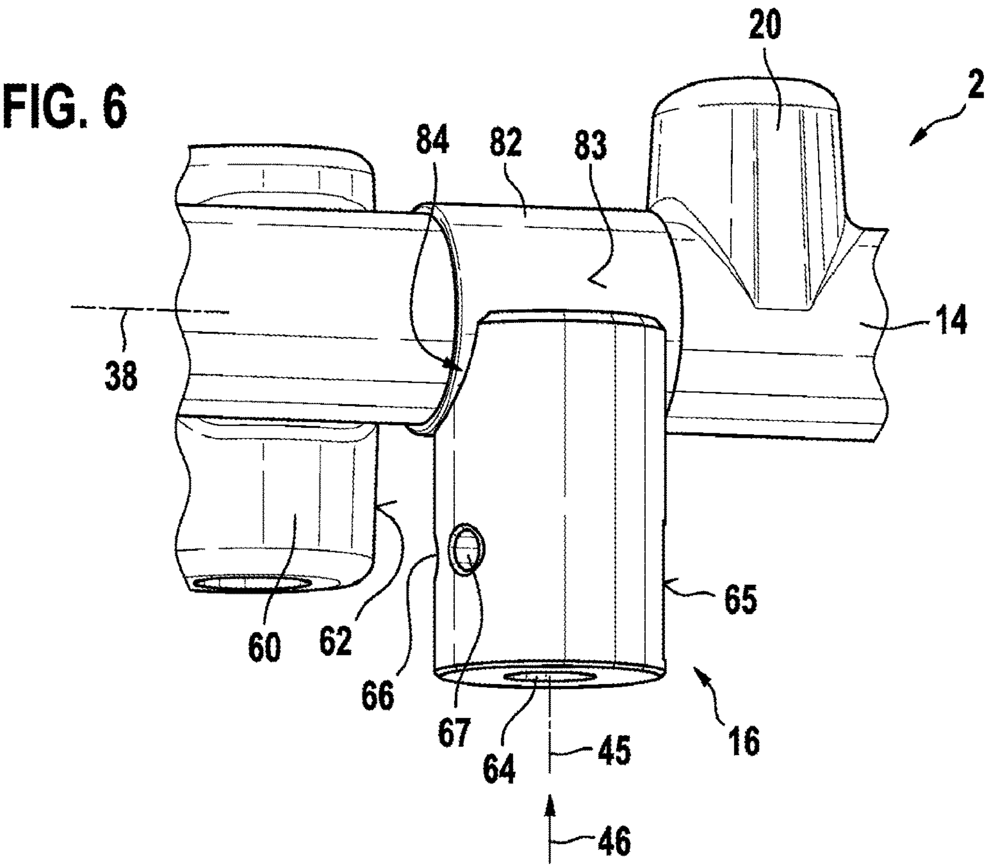
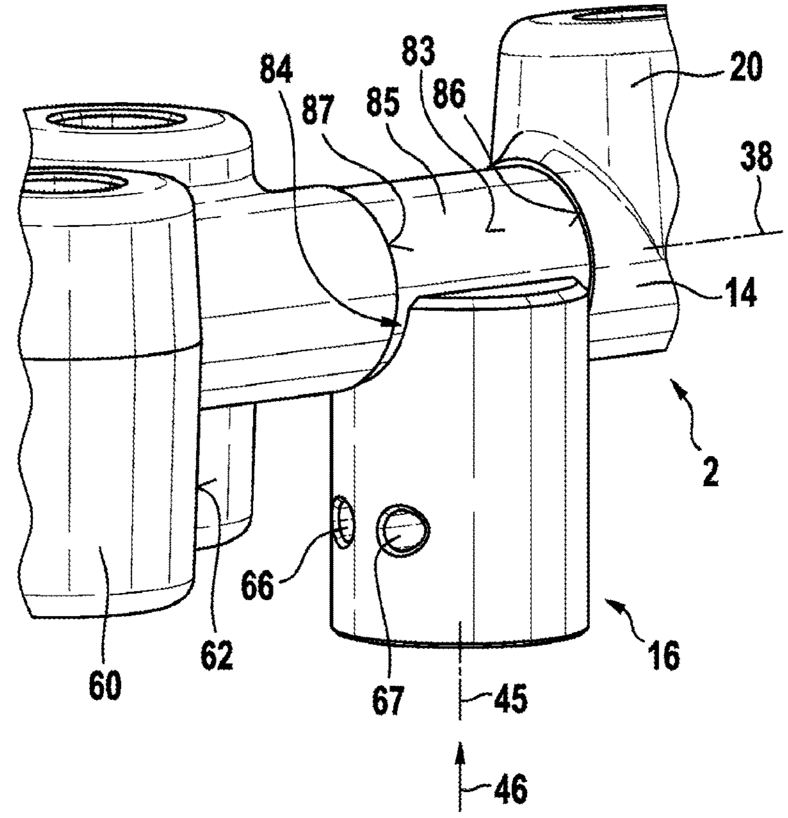
FIG. 7

FUEL DISTRIBUTOR RAIL FOR AN INJECTION SYSTEM AND INJECTION SYSTEM FOR MIXTURE-COMPRESSING, SPARK IGNITION INTERNAL COMBUSTION ENGINES

FIELD

The present invention relates to a fluid distributor, in particular, a fuel distributor rail, for an injection system which is used for mixture-compressing, spark ignition internal combustion engines. Specifically, the present invention relates to the field of injection systems of motor vehicles, in which a direct injection of fuel into combustion chambers of an internal combustion engine takes place.

BACKGROUND INFORMATION

A method for manufacturing a fuel distributor is described in German Patent Application No. DE 10 2016 115 550 A1, in which a manifold is manufactured from a forging blank. In the process, austenitic steels may be used. German Patent Application No. DE 10 2018 110 342 A1 describes two embodiments for a fuel distributor which significantly differ from one another. In the first embodiment, a forged pressure accumulator pipe is closed with a closing piece. In the process, the closing piece is not screwed in, but is inserted into one end of the pressure accumulator pipe and inductively soldered in. In the second embodiment, a connecting piece is provided, instead of the closing piece which closes the end. This connecting piece is provided with an external thread which is required for assembly.

A fuel injection system for high pressure injection in internal combustion engines is described in German Patent Application No. DE 10 2012 206 887 A1. In the process, a fuel injector is attached by a holding element to an associated cup. The holding element includes a first leg and a second leg, which are guided through recesses in a wall of the cup.

SUMMARY

A fluid distributor according to the present invention and the injection system according to the present invention have the advantage that an improved design and functionality are made possible.

The measures disclosed herein allow advantageous refinements of the fluid distributor of the present invention and of the injection system of the present invention.

The injection system according to the present invention is used for mixture-compressing, spark ignition internal combustion engines. The injection system according to the present invention is used for injecting gasoline and/or ethanol and/or comparable fuels and/or for injecting a mixture including gasoline and/or ethanol and/or comparable fuels. The mixture may, for example, be a mixture including water. The fluid distributor according to the present invention is used for such injection systems.

According to an example embodiment of the present invention, at least the base body of the fluid distributor is formed of a material which is preferably a corrosion-resistant steel (stainless steel), in particular, an austenitic stainless steel. It is also possible to use a steel which is not corrosion-resistant if it has a corresponding coating against corrosion. In particular, the material may be based on an austenitic stainless steel having the material number 1.4301 or 1.4307 or on a stainless steel comparable thereto. A hydraulic connection provided at the base body may be designed as a high pressure input, a high pressure output, or another high pressure connection. The base body is then preferably configured as a forging blank, together with the high pressure input and possibly one or multiple other high pressure connection(s) during the manufacture, and is further processed.

According to an example embodiment of the present invention, at least one high pressure connection designed as a high pressure output, however, is formed at least partially by a connecting piece which, during the manufacture, is initially processed separately from the tubular base body. The connecting piece may, for example, be machined separately from the tubular base body and then preferably be joined to the tubular base body in an integral manner or possibly also in a force-fit manner. An integral joint may, in particular, be formed by soldering, in particular inductive soldering, or by welding, in particular by laser welding, the joining method preferably be designed in such a way that only local heating of the involved components occurs.

The described configuration of a fuel distributor of the present invention including a forged base body thus results in considerable differences compared to a soldered rail, in which a pipe for the soldered rail is machined and deburred before the attachment components are soldered on. Due to the forged embodiment, in particular, a design for higher pressures may be made possible. A considerable difference compared to a high pressure rail for compression ignition engines is the material selection and the processing, in particular the forging of a stainless steel. The general configuration of the high pressure output also differs fundamentally between the fuel distributor for the compression ignition engine and the spark ignition engine.

Since the connecting pieces may be processed, in particular machined, independently of the forged base body, considerable advantages result during the manufacture. In particular, design embodiments may be implemented which would not be possible to implement, or would only be possible to be implemented with disproportionately high complexity, in the case of an embodiment forged from one piece. For this reason, in particular, a suspension for one or multiple fuel injectors may advantageously be implemented. For example, due to the connecting pieces, it is then also possible to implement long, projecting cups including longitudinal and cross boreholes as well as possibly steps and undercuts at the high pressure outputs. Furthermore, cost advantages also result compared to an embodiment forged in one piece when the base weight for a forging blank may be reduced to such an extent that the additional costs for a turnkey joining process, in particular, a soldering process, are more than compensated.

One advantageous refinement of the present invention is particularly advantageous in this regard. In particular, this simplifies the manufacture of the connecting pieces in a series manufacture. The respective required number of connecting pieces may then be assigned to a forged base body for the manufacture of a fluid distributor.

In one advantageous refinement of the present invention, it is also possible for an outer side of the connecting piece to be processed, which in the final state would only be accessible with difficulty or not at all. Another refinement of the present invention has corresponding advantages. Moreover, a drill of a drilling tool may advantageously be placed on a planar partial area. Furthermore, geometries may be implemented which, due to the requirements during the demolding of a forging blank, cannot be implemented, at least not in an off-tool manner, as disclosed herein.

One or multiple accommodating openings may advantageously be implemented according to an example embodiment of the present invention. This allows a simple implementation of the accommodating opening. Moreover, a refinement according to the present invention may advantageously be implemented to enable a reliable positioning of the suspended injectors. An advantageous suspension is possible according to the refinement according to present invention. In the process, the connector of the injector may rest directly against the legs of the holding element. It is also possible for it to rest indirectly thereagainst, for example with the aid of at least one intermediate piece or bearing piece and/or with the aid of at least one damping element. The legs of the holding element may advantageously have a circular profile in the process.

BRIEF DESCRIPTION OF THE DRAWINGS

Preferred exemplary embodiments of the present invention are described in greater detail in the following description with reference to the figures, in which corresponding elements are provided with concurrent reference numerals.

FIG. 2 shows the fluid distributor illustrated in FIG. 1 corresponding to a first exemplary embodiment in an excerpted, detailed, schematic representation.

FIG. 3 shows the fluid distributor illustrated in FIG. 1 corresponding to a second exemplary embodiment in a detailed, schematic representation.

FIG. 4 shows the fluid distributor illustrated in FIG. 1 corresponding to a third exemplary embodiment in a detailed, schematic representation.

FIG. 5 shows the fluid distributor illustrated in FIG. 1 corresponding to a fourth exemplary embodiment in a detailed, schematic representation.

FIG. 6 shows the fluid distributor illustrated in FIG. 1 corresponding to a fifth exemplary embodiment in a detailed, schematic representation.

FIG. 7 shows the fluid distributor illustrated in FIG. 1 corresponding to a sixth exemplary embodiment in a detailed, schematic representation.

DETAILED DESCRIPTION OF EXAMPLE EMBODIMENTS

Figure 1:
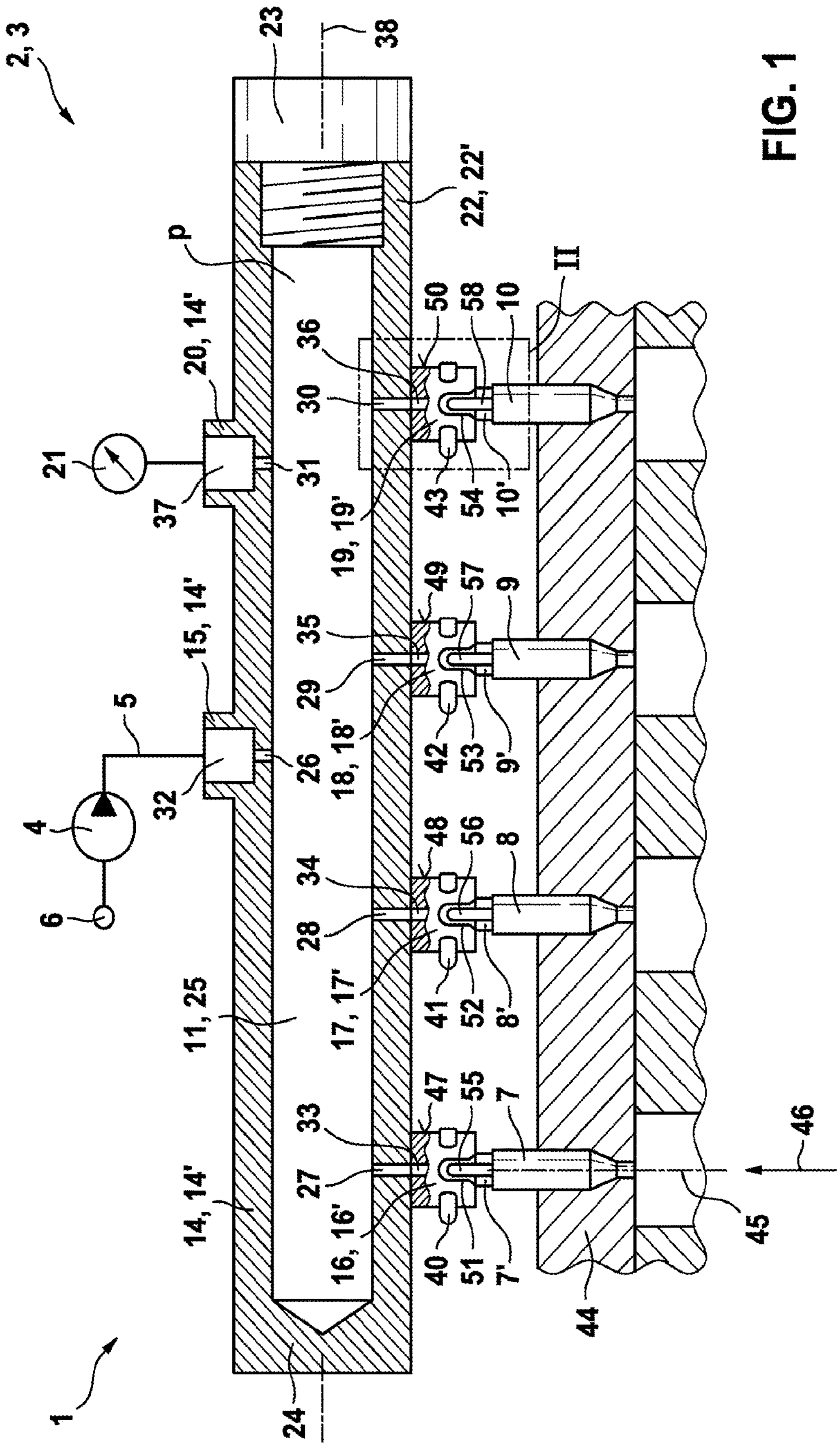
FIG. 1 shows an injection system for a mixture-compressing, spark ignition internal combustion engine including a fuel distributor designed as a fluid distributor in a schematic sectional illustration corresponding to one possible embodiment of the present invention.

FIG. 1 shows an injection system 1 including a fuel distributor (fluid distributor) 2 in a schematic sectional illustration corresponding to one possible embodiment. In this embodiment, fuel distributor 2 of fuel injection system 1 is a fuel distributor rail 3 designed corresponding to the present invention. Furthermore, a high pressure pump 4 is provided. High pressure pump 4 is connected via a fuel line 5 designed as a high pressure line 5 to fuel distributor 2. During operation, a fuel or a mixture including fuel is supplied as the fluid at an input 6 of high pressure pump 4.

Fuel distributor 2 is used for storing and distributing the fluid among injectors 7 through 10 designed as fuel injectors 7 through 10 and reduces pressure fluctuations and pulsations. Fuel distributor 2 may also be used for damping pressure pulsations, which may occur when switching fuel injectors 7 through 10. In the process, during operation, high pressures p may occur at least temporarily in an interior space 11 of fuel distributor rail 3.

Fuel distributor 2 designed as fuel distributor rail 3 includes a tubular base body 14, which is formed by a one-stage or multi-stage forging process and is subsequently machined. Fuel distributor rail 3 furthermore includes a high pressure input 15 and multiple connecting pieces 16 through 19, which are provided at tubular base body 14 and are used for high pressure outputs 16' through 19'. Furthermore, a pressure sensor connection 20 is provided at tubular base body 14. In this embodiment, tubular base body 14, high pressure input 15, and pressure sensor connection 20 are formed of a forged individual part 14'. High pressure input 15 and pressure sensor connection 20 are thus forged to base body 14.

Connecting pieces 16 through 19, however, are not forged to base body 14 and are initially manufactured separately therefrom, in particular, processed by a machining operation. Connecting pieces 16 through 19 may be joined to base body 14 by soldering. However, other integral joints are also possible. Depending on the application, a force-fit joint may also be useful.

Fuel injectors 7 through 10 are in each case connected to high pressure outputs 16' through 19' of fuel distributor 2. In the process, fuel injectors 7 through 10 are suspended at the connecting pieces serving as cups 16 through 19 in the mounted state. Furthermore, a pressure sensor 21 is provided, which is connected to pressure sensor connection 20. At one end 22, tubular base body 14 is closed by a closure 23 designed as a screw plug 23 in this exemplary embodiment. In the process, end 22 of tubular base body 14 may be designed as a threaded connector 22'. In one modified embodiment, an axial high pressure input may be provided at end 22 or at an end 24, instead of radial high pressure input 15.

After forging, tubular base body 14 or forged individual part 14' is processed by at least a machining operation. In this embodiment, a borehole 25 is also formed in tubular base body 14 after forging to form interior space 11. Via interior space 11, the fluid supplied at high pressure input 15 may be distributed during operation among fuel injectors 7 through 10 connected to high pressure outputs 16' through 19'.

Moreover, boreholes 26 through 31 are introduced into forged individual part 14' by a machining operation. In the process, boreholes 27 through 30 serve as connecting boreholes 27 through 30 for high pressure outputs 16' through 19'. Borehole 26 is used for high pressure input 15. Borehole 31 is used for pressure sensor connection 20.

Moreover, boreholes 32 through 37 are provided at high pressure input 15, high pressure outputs 16' through 19', and pressure sensor connection 20. In this exemplary embodiment, borehole 25 is axially oriented with respect to a longitudinal axis 38. Boreholes 32 through 37 are radially oriented with respect to longitudinal axis 38 in this exemplary embodiment.

In the schematic representation of FIG. 1, boreholes 33 through 36 are radially oriented with respect to longitudinal axis 38. In possible embodiments of the present invention, boreholes 33 through 36 are preferably radially or radially-eccentrically oriented with respect to longitudinal axis 38. Positionings of high pressure input 15, of pressure sensor connection 20, and of connecting pieces 16 through 19, in particular, along longitudinal axis 38 are only selected by way of example in FIG. 1 and the other figures and are possibly selected with respect to a simplified representation. Specifically, these positionings are not necessarily selected in a uniform and consistent manner in the various figures.

A holding element 40 through 43 is provided at each of high pressure outputs 16' through 19'. Holding element 40 is also further described based on FIG. 3 by way of example. In the mounted state, connectors 7' through 10' of injectors 7 through 10 are suspended at high pressure outputs 16' through 19' via holding elements 40 through 43. Injectors 7 through 10 are situated in boreholes of a cylinder head 44. As a result of the respective implemented suspension, a bracing of injectors 7 through 10 at cylinder head 44 may be avoided. For example, during assembly, injector 7 is inserted into connecting piece 16 in a mounting direction 46 along axis 45. In the mounted state, a bracing of injector 7 counter to mounting direction 46 is then ensured by holding element 40. Recesses 51 through 54 are provided at outer sides 47 through 50 of connecting pieces 16 through 19, which extend along mounting direction 46 and in which, during assembly, in each case a nose 55 through 58 of injectors 7 through 10 engages, to form an anti-twist protection. As a result, injectors 7 through 10 are then reliably attached.

Based on FIGS. 2 through 10, fluid distributor 2 and injection system 1 are further described hereafter in possible embodiments corresponding to a first through ninth exemplary embodiment. Depending on the application, a combination of the described measures may also possibly be implemented in the process if useful. In particular, within the scope of a series manufacture, however, it may be useful when, in particular, connecting pieces 16 through 19 are correspondingly configured for a specific application. Based on FIG. 11, one problem is illustrated which would occur in the case of a configuration from a forged individual part. In the described exemplary embodiments, one embodiment is described by way of example based on connecting piece 16 or high pressure output 16'.

FIG. 2 shows fluid distributor 2 illustrated in FIG. 1 corresponding to a first exemplary embodiment in a detailed, schematic representation. Fluid distributor 2 includes attachment pieces 60, 61 via which fluid distributor 2 may be suitably attached to cylinder head 44. In this exemplary embodiment, attachment pieces 60, 61 are forged in one piece with tubular base body 14. This results in limitations with respect to the shaping. In particular, draft angles are to be provided so that, for example, a conical outer side 62 may result at attachment piece 60. In contrast thereto, connecting piece 16 may be based on a cylindrical basic shape 63. Proceeding from cylindrical basic shape 63, a further machining operation may take place. In this way, for example, recess 51, a borehole 64 along axis 45, which forms an accommodating space 64 for connector 7' of injector 7, a planar partial area 65 of outer side 47, and boreholes 66, 67 through a wall 68 of connecting piece 16 may be formed, which form accommodating openings for holding element 40.

Connecting piece 16 designed as cup 16 may thus be processed as an individual part to such an extent that only a joint to tubular base body 14 is still required. In this way, it is possible, on the one hand, to avoid limitations by the forging operation with respect to the shaping. On the other hand, considerable advantages result during the manufacture with respect to a tool accessibility, which would possibly not exist in the case of a one-piece forged embodiment of a fluid distributor, such as, for example, in the case of fluid distributor 2' shown in FIG. 11.

Connecting piece 16 may be joined to tubular base body 14 via a soldered joint. In particular, inductive soldering may be used, in which only local heating in the joining area is required, so that existing strength advantages remain, in particular, at highly loaded locations, e.g. intersecting boreholes. In this connection, certain welding methods, such as the laser beam welding method, are also suitable for joining since with this method also only local heating in the joining area may be implemented.

FIG. 3 shows fluid distributor 2 illustrated in FIG. 1 corresponding to a second exemplary embodiment in a detailed, schematic representation. In cylindrical basic shape 63, a recess 69 is incorporated by the machining operation, which is adapted to an outer side 70 of tubular base body 14. In this way, an improved mechanical load capacity is achieved. Furthermore, holding element 40 is shown, which includes a first leg 71 and a second leg 72. During assembly, initially connector 7' of injector 7 is at least partially inserted into accommodating space 64 (FIG. 2) along axis 45 in mounting direction 46. Holding element 40 is then guided in a direction 73 through wall 68 of connecting piece 16, first leg 71 being inserted into borehole 66 and second leg 72 being inserted into borehole 67. Thereafter, injector 7 is suspended at connecting piece 16. In this exemplary embodiment, planar partial area 65 is delimited by an undercut 74 which follows planar partial area 65 counter to mounting direction 46. This undercut 74 may advantageously be formed by the machining operation.

FIG. 4 shows fluid distributor 2 illustrated in FIG. 1 corresponding to a third exemplary embodiment in a detailed, schematic representation. Undercut 74 is situated between planar partial area 65 and an underside 75. In a modified exemplary embodiment, planar partial area 65 may also extend up to underside 75 of connecting piece 16.

Holding element 40 shown in FIG. 3 is inserted along an axis 80, which is perpendicular to planar partial area 65, in direction 73 into connecting piece 16. While in the exemplary embodiments shown in FIG. 2 and FIG. 3 axis 80 is at least approximately in parallel to a longitudinal axis 38 of tubular base body 14, in the exemplary embodiment shown in FIG. 4 a non-vanishing rotation of axis 80 about axis 45 with respect to longitudinal axis 38 of tubular base body 14 is provided. This may result in the situation that recess 51 points toward conical outer side 62 of attachment piece 60. If connecting piece 16 were forged in one piece to tubular base body 14, recess 51 would not be creatable, or only with disproportionate complexity, since attachment piece 60 is possibly in the way of a machining tool. In contrast, this embodiment is implementable in the described fluid distributor 2 since the machining operation takes place prior to joining connecting piece 16 to tubular base body 14.

FIG. 5 shows fluid distributor 2 illustrated in FIG. 1 corresponding to a fourth exemplary embodiment in a detailed, schematic representation. In this exemplary embodiment, axis 80 may be oriented at least approximately in parallel to longitudinal axis 38 of tubular base body 14 so that holding element 40 is inserted in parallel to longitudinal axis 38 in direction 73 into connecting piece 16. In this exemplary embodiment, boreholes 66, 67 open into a cylindrical jacket-shaped partial area 81 of outer side 47 of connecting piece 16. Depending on the application, for example, an embodiment may be implemented in the process in which, on the one hand, a planar partial area 65, as shown in FIG. 3, and, on the other hand, a cylindrical jacket-shaped partial area 81 are implemented. However, it is also possible to implement two planar partial areas or two cylindrical jacket-shaped partial areas.

In this exemplary embodiment, cylindrical jacket-shaped partial area 81 is situated close to conical outer side 62 of attachment piece 60. Processing, in particular, a formation of boreholes 66, 67, without difficulty is possible since this takes place prior to the joining of connecting piece 16 to tubular base body 14.

FIG. 6 shows fluid distributor 2 illustrated in FIG. 1 corresponding to a fifth exemplary embodiment in a detailed, schematic representation. In this exemplary embodiment, a projection 82 is configured at tubular base body 14, at which, for example, a cylindrical jacket-shaped outer side 83 may be configured. For example, during forging, initially projection 82 may be configured with a certain material excess. Thereafter, projection 82 may be at least partially post-processed at projection 82. This results in a very precisely predefinable joining gap at least in a joining area 84 in which connecting piece 16 is joined to projection 82 of tubular base body 14. In a modified embodiment, cylindrical jacket-shaped outer side 83 may also be implemented at a depression instead of a projection 82 during a post-processing operation. In this way, a joining surface 83 may be formed at tubular base body 14 by a machining operation, at which connecting piece 16 is joined to tubular base body 14. In this exemplary embodiment, joining surface 83 is formed by cylindrical jacket-shaped outer side 83, however, other geometries are also possible.

FIG. 7 shows fluid distributor 2 illustrated in FIG. 1 corresponding to a sixth exemplary embodiment in a detailed, schematic representation. In this exemplary embodiment, a depression 85 is formed at tubular base body 14 by the machining post-processing operation, shoulders 86, 87 being implemented.

One of shoulders 86, 87 may possibly be used for positioning connecting piece 16 along longitudinal axis 38.

Figure 8:
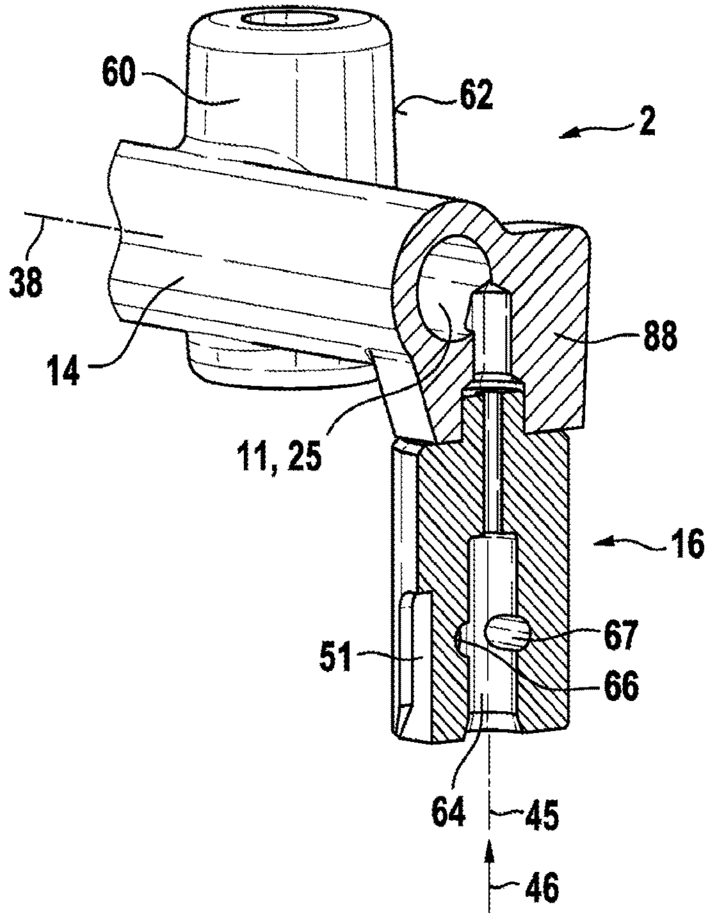
FIG. 8 shows the fluid distributor illustrated in FIG. 1 corresponding to a seventh exemplary embodiment in a detailed, schematic representation.
Figure 9:
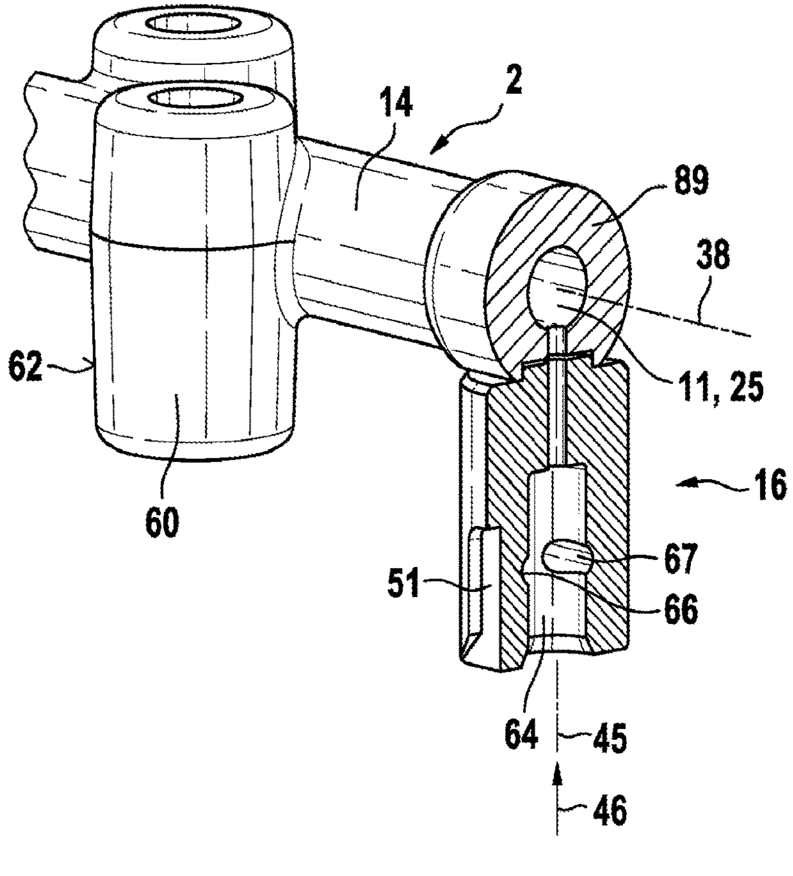
FIG. 9 shows the fluid distributor illustrated in FIG. 1 corresponding to an eighth exemplary embodiment in a detailed, schematic representation.

FIG. 8 and FIG. 9 each show the fluid distributor illustrated in FIG. 1 corresponding to a seventh and an eighth exemplary embodiment in a detailed, schematic representation. A joining piece 88, 89 is forged in each case to base bodies 14, at which connecting piece 16 is joined in each case to tubular base body 14. In the exemplary embodiment shown in FIG. 8, joining piece 88 is eccentrically configured with respect to longitudinal axis 38. In the exemplary embodiment shown in FIG. 9, joining piece 89 is at least essentially not eccentrically configured. A suitable post-processing operation, in particular, a machining operation, of tubular base body 14 may take place in each case before connecting piece 16 is joined to tubular base body 14.

Figure 10:
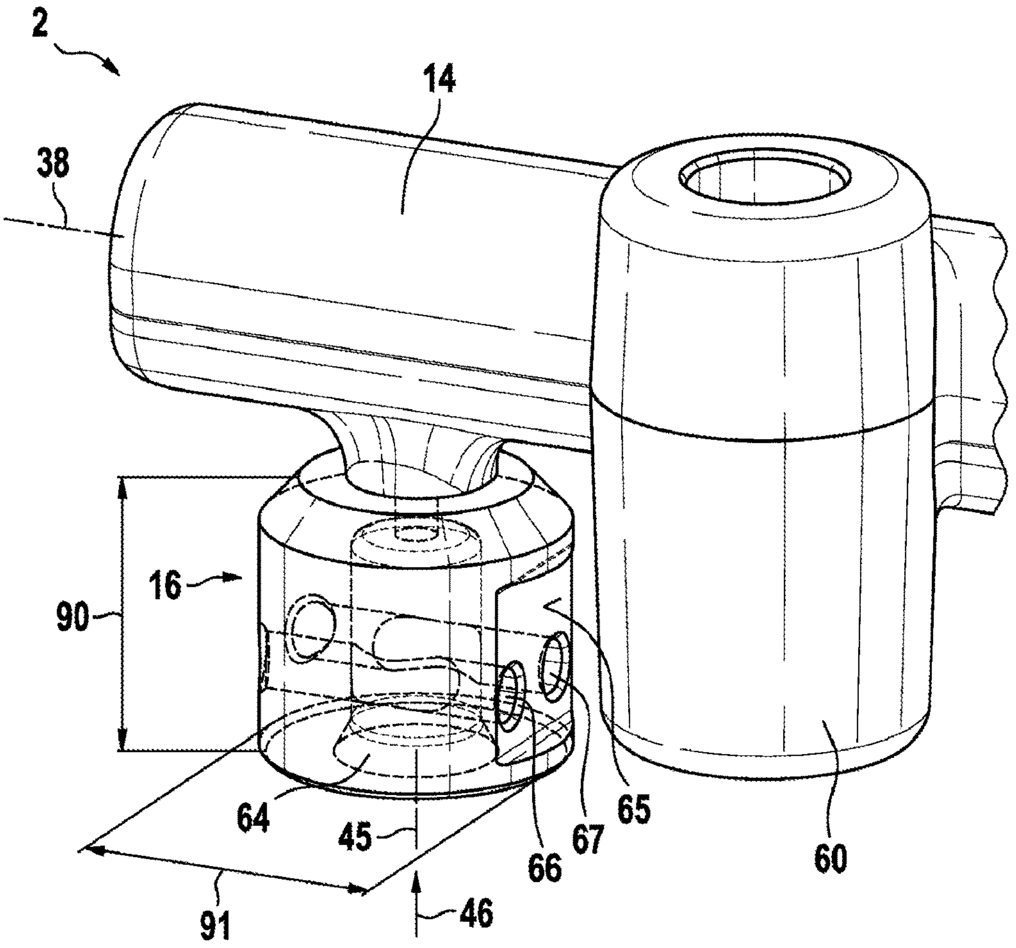
FIG. 10 shows the fluid distributor illustrated in FIG. 1 corresponding to a ninth exemplary embodiment in a detailed, schematic representation.

FIG. 10 shows fluid distributor illustrated in FIG. 1 corresponding to a ninth exemplary embodiment in a detailed, schematic representation. In this exemplary embodiment, connecting piece 16 may be designed with a short length 90 along axis 45. In particular, length 90 may be predefined to be at least approximately comparable to or as large as, or also smaller than, an outside diameter 91 of connecting piece 16. In this way, compact dimensions are implementable. Since the machining operation of connecting piece 16 takes place prior to joining, good tool accessibility exists so that also a cup (connecting piece) 16 having a short design is implementable.

Figure 11:
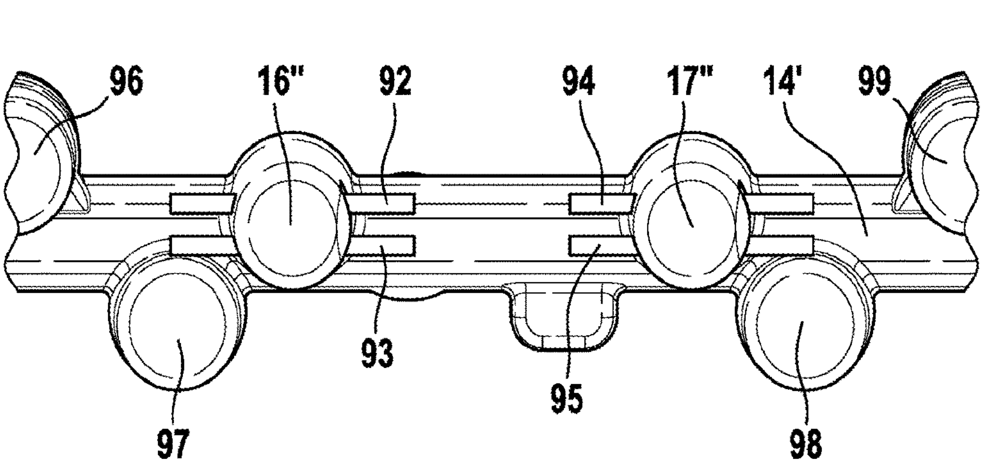
FIG. 11 shows an excerpted fluid distributor for explaining the operating mode of an example embodiment of the present invention in a schematic representation.

FIG. 11 shows a detail view of fluid distributor 2' for explaining the operating mode of the present invention in a schematic representation. Fluid distributor 2' differs from the described fluid distributor 2 in that connecting pieces 16'', 17'' are forged to a tubular base body 14'. The configurations explained in the described exemplary embodiments based on FIGS. 1 through 10 are then not implementable, or only with disproportionately high complexity. Cylinders 92 through 95 illustrate how, for example, drilling tools must be positioned during the processing. It is apparent that the required tool accessibility is not ensured by further pieces 96 through 98 which are forged to tubular base body 14', but also not by connecting pieces 16'', 17'' themselves.

In this way, additional designs having low manufacturing costs may be implemented by the described configuration of fluid distributor 2 compared to a fluid distributor 2' forged in one piece. In particular, designs which enable a suspension of injectors 7 through 10 are implementable. In the process, arbitrary orientations of an axis 80 or a direction 73 for mounting a holding element 40 may be implemented, as is illustrated, for example, based on FIGS. 3 and 4. In principle, it is possible that a further processing of fluid distributor 2 also takes place after connecting pieces 16 through 19 have been joined to tubular base body 14. In particular, a suitable post-processing may take place, if this is useful in the particular application.

The embodiment of holding element 40 including the two legs 71, 72 has the advantage that, in the mounted state, connector 7' of injector 7, which is at least partially situated in accommodating space (borehole) 64 of connecting piece 16, is braced at opposing sides.

The present invention is not restricted to the described possible embodiments and exemplary embodiments.

What is claimed is:

1. A fluid distributor for an injection system for a mixture-compressing, spark ignition internal combustion engine, which is used for metering a highly pressurized fluid, the fluid distributor being a fuel distributor rail, the fluid distributor comprising:

a base body;

at least one high pressure output;

at least one connecting piece which is joined to the base body and is configured for high pressure output, the base body being formed by a one-stage or multi-stage forging operation, at least one interior space of the base body being formed at the base body by a machining operation after the forging operation, and the connecting piece being processed by a machining operation; and at least one holding element, wherein, as a result of the machining operation, at least one accommodating opening, which leads from an outer side of the connecting piece through a wall of the connecting piece and at least partially accommodates the holding element, and an accommodating space, into which, during assembly, a connector of an injector is at least partially insertable in a mounting direction, are formed at the connecting piece;

wherein, in the mounted state, the connector of the injector, which is at least partially situated in the accommodating space of the connecting piece, is at least indirectly braced counter to a mounting direction by the holding element situated in the accommodating opening, wherein the holding element includes a first leg and a second leg, wherein an at least essentially planar partial area is formed at the outer side of the connecting piece.

2. The fluid distributor as recited in claim 1, wherein: (i) the connecting piece is processed by the machining operation prior to being joined to the base body, and/or (ii) a joining surface including an at least partially cylindrical jacket-shaped joining surface, is configured at the base body by the machining operation, at which the connecting piece is joined to the base body, and/or (iii) a projection or a depression or a flattening joining piece or a forged-on joining piece is provided at the base body, at which the connecting piece is joined to the base body.

3. The fluid distributor as recited in claim 1, wherein at least one outer side of the connecting piece is at least partially processed at the connecting piece by the machining operation.

4. The fluid distributor as recited in claim 1, wherein the accommodating opening, which leads through the wall of the connecting piece and at least partially accommodates the holding element, is configured as a continuous accommodating borehole.

5. The fluid distributor as recited in claim 1, wherein a recess extending along the mounting direction is formed at the outer side of the connecting piece, in which, in the mounted state, a nose of the injector engages for forming an anti-twist protection.

6. The fluid distributor as recited in claim 1, wherein the connecting piece is based on a cylindrical basic shape.

7. The fluid distributor as recited in claim 1, wherein the accommodating opening accommodating the first leg of the holding element, a further accommodating opening, which leads from the outer side of the connecting piece through a wall of the connecting piece and accommodates the second leg of the holding element, is formed at the connecting piece by the machining operation, and wherein, in the mounted state, the first leg of the holding element situated in the accommodating opening and the second leg situated in the further accommodating opening at least indirectly brace the connector of the injector situated at least partially in the accommodating space of the connecting piece, at opposing sides.

8. A fluid distributor for an injection system for a mixture-compressing, spark ignition internal combustion engine, which is used for metering a highly pressurized fluid, the fluid distributor being a fuel distributor rail, the fluid distributor comprising:

a base body;

at least one high pressure output;

at least one connecting piece which is joined to the base body and is configured for high pressure output, the base body being formed by a one-stage or multi-stage forging operation, at least one interior space of the base body being formed at the base body by a machining operation after the forging operation, and the connecting piece being processed by a machining operation; and at least one holding element, wherein, as a result of the machining operation, at least one accommodating opening, which leads from an outer side of the connecting piece through a wall of the connecting piece and at least partially accommodates the holding element, and an accommodating space, into which, during assembly, a connector of an injector is at least partially insertable in a mounting direction, are formed at the connecting piece;

wherein, in the mounted state, the connector of the injector, which is at least partially situated in the accommodating space of the connecting piece, is at least indirectly braced counter to a mounting direction by the holding element situated in the accommodating opening, wherein the holding element includes a first leg and a second leg, wherein an at least essentially planar partial area is formed at the outer side of the connecting piece, and the accommodating opening, which leads from the outer side of the connecting piece through the wall of the connecting piece and accommodates the holding element, leads from the essentially planar partial area of the outer side through the wall of the connecting piece.

9. The fluid distributor as recited in claim 8, wherein the essentially planar partial area is delimited by an undercut which follows the essentially planar partial area counter to the mounting direction.

10. An injection system for mixture-compressing, spark ignition internal combustion engines, which is used for injecting a fluid, which is fuel including gasoline and/or ethanol and/or a mixture including fuel, the injection system comprising:

at least one fluid distributor for metering the fluid, the fluid distributor being a fuel distributor rail, each of the at least one fluid distributor comprising:

a base body, at least one high pressure output, at least one connecting piece which is joined to the base body and is configured for high pressure output, the base body being formed by a one-stage or multi-stage forging operation, at least one interior space of the base body being formed at the base body by a machining operation after the forging operation, and the connecting piece being processed by a machining operation, and at least one holding element, wherein, as a result of the machining operation, at least one accommodating opening, which leads from an outer side of the connecting piece through a wall of the connecting piece and at least partially accommodates the holding element, and an accommodating space, into which, during assembly, a connector of an injector is at least partially insertable in a mounting direction, are formed at the connecting piece, wherein, in the mounted state, the connector of the injector, which is at least partially situated in the accommodating space of the connecting piece, is at least indirectly braced counter to a mounting direction by the holding element situated in the accommodating opening, wherein the holding element includes a first leg and a second leg, wherein an at least essentially planar partial area is formed at the outer side of the connecting piece.

* * * * *